Jan. 16, 1945.     O. M. ANDERSON     2,367,188

HOSE COUPLING FOR VACUUM CLEANERS

Filed April 27, 1943

Inventor
Oscar M. Anderson
by Lindsey and Robillard,
Attorneys

Patented Jan. 16, 1945

2,367,188

UNITED STATES PATENT OFFICE 2,367,188

HOSE COUPLING FOR VACUUM CLEANERS

Oscar M. Anderson, New Britain, Conn., assignor to Landers, Frary & Clark, New Britain, Conn., a corporation of Connecticut Application April 27, 1943, Serial No. 484,750

3 Claims. (Cl. 285—168)

This invention relates to a hose or pipe coupling which, while having general application, is particularly adapted for use in detachably securing a hose to the intake opening of a vacuum cleaner.

The aim of the invention is to provide a coupling which has various features of novelty and advantage and which is particularly characterized by its simplicity in construction, by its economy in manufacture, and by the ease and facility with which the pipe members may be quickly connected together and disconnected from one another.

A further object of the invention is to provide an improved hose coupling which will securely hold the telescoping parts together, which will prevent such parts from rattling, which will form an effective air seal between the telescoping members, and which, as externally viewed, has a neat and pleasing appearance.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

Figure 1:
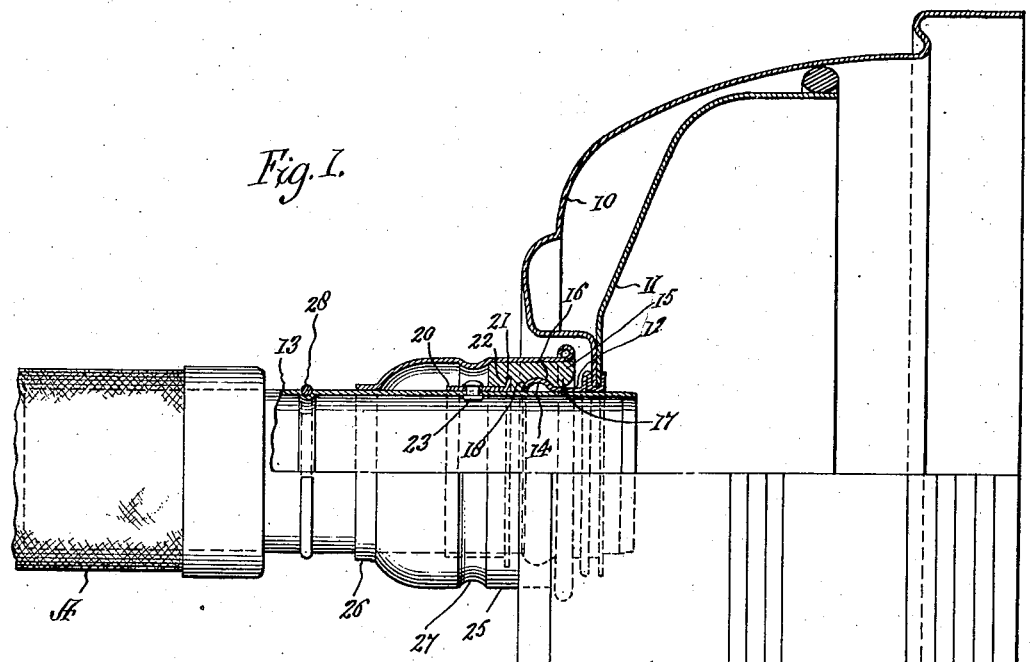
Figure 1 is a side view, partly in section and partly in elevation, of my improved coupling as applied to the end of a hose and the intake opening of a vacuum cleaner, the coupling being shown in engaged position.
Figure 3:
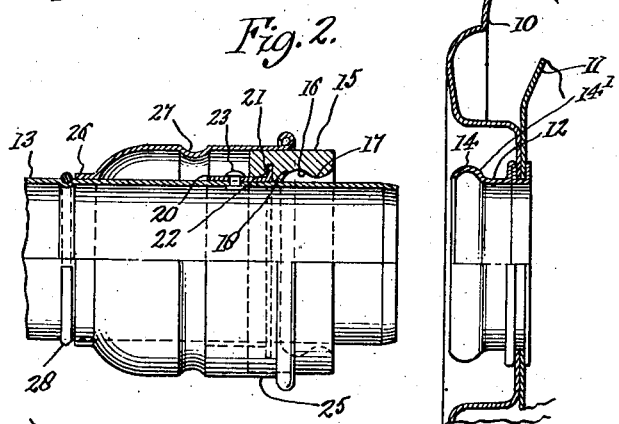
Fig. 3 is a perspective view of a portion of the member for anchoring the resilient clamping ring to one of the pipe members.

Referring to the drawing, I have shown therein, by way of exemplification only, my improved coupling employed for securing a flexible hose A to the closure B of a tank-type vacuum cleaner such as is illustrated in the Anderson, et al. Patent No. 2,245,953 granted June 17, 1941. The closure is shown as having an outer shell 10 and an inner shell 11, the shells being secured together by a pipe or tube 12 which forms the inlet opening of the cleaner. One end of the hose receives, and is secured to, a pipe or tube 13 which, as usual, is adapted to telescope into the tube 12.

In accordance with the present invention, the tube 12 has, adjacent its outer or forward end, an external circumferential shoulder 14' which, in the illustrative embodiment shown, is formed by providing the tube with a bead or rib 14 which may be parti-circular in cross section. This shoulder 14' is generally rearwardly facing and outwardly and forwardly inclined. Secured to and surrounding the pipe 13 is a resilient clamping ring 15 formed of rubber or other suitable elastic material. This ring is in the form of a sleeve and it has, adjacent its rear end, an internal annular bead 17 which may be parti-circular in cross section. The forward wall of the bead 17 constitutes a generally forwardly facing and inwardly and rearwardly inclined shoulder 16 which is complementary to, and adapted to engage behind, the shoulder 14'. In the present illustrative disclosure, the internal periphery of the resilient ring 15 has, forwardly of the bead 17, a groove 18 which is adapted to receive the bead 14 when the parts are connected together, as shown in Fig. 1. The resilient ring, adjacent its forward end, is connected to the pipe 13 by means of an anchoring member 20 which is in the form of a cylindrical piece fitted about the pipe 13 and having a radial flange 21 at its rear end which is received by an internal kerf or cut 22 provided in the resilient ring 15. The anchoring member is suitably secured to the pipe as by means of the rivet 23. By preference, the forward end of the resilient ring closely hugs the anchoring member 20.

Slidably mounted on the pipe 13 and adapted to encircle the resilient ring 15 is a restraining sleeve or collar 25. This collar, at its rear end, is of such internal diameter as to closely fit about the resilient ring when the coupling is in engaged position. The forward end of the collar is reduced, as at 26, so as to slidably fit about the pipe 13. Intermediate its ends, the collar has a circumferential internal bead 27 which engages the forward end of the resilient ring when the parts are in operative position. For the purpose of limiting the extent to which the collar 25 may be backed off of the ring 15, the pipe 13 is provided with a groove in which is seated a split ring 28.

Figure 2:
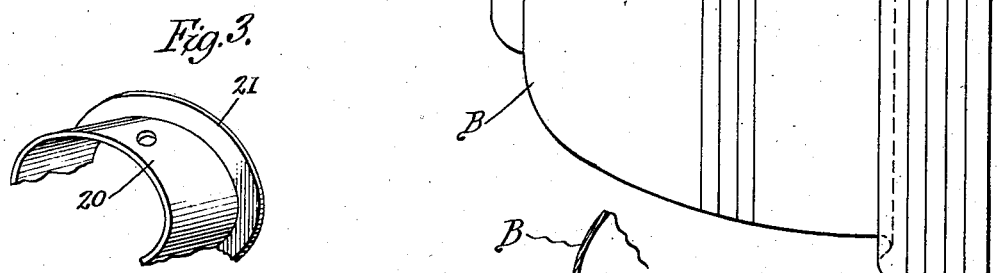
Fig. 2 is a view similar to Fig. 1 but illustrating the coupling in disengaged condition.

It will be seen from Fig. 1 that, when the parts are in coupled position, the shoulder 16 of the resilient ring is engaged with the shoulder 14' of the tube 12 and the collar 25 is in encircling relation with respect to the ring 15 so that the parts are securely held together. The bead 14 is engaged in the groove 18. The collar 25 prevents outward expansion of the rear end of the clamping ring so that the bead 17 of the ring cannot ride over the bead 14 of the tube 12 in the event that pressure is exerted in a direction tending to withdraw the pipe 13 from the tube 12. Furthermore, when the parts are in coupled relation, the resilient ring snugly encircles both of the pipe members so that an effective air seal is provided therebetween. When it is desired to disconnect the parts, it is merely necessary to withdraw the restraining sleeve 25 to the position shown in Fig. 2 and then pull the two pipe members apart during which operation the bead 17 of the resilient ring will ride over the bead 14, the forward end of the resilient ring now being relatively free to flex outwardly. When it is desired to again connect the parts, it is merely necessary to slip the rear end of the pipe 13 into the tube 12 and, after the bead 17 is engaged behind the shoulder 14', slip the restraining collar rearwardly to the position shown in Fig. 1. These operations may be very quickly and easily carried out.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a pair of telescoping members, the outer one of said members having an external rearwardly facing shoulder, a resilient clamping ring of elastic material about the other of said members and having a continuous annular internal bead adapted to engage behind said shoulder, means for securing said ring to the inner telescoping member, and a restraining collar slidably mounted on said inner member and having a portion encircling said ring for preventing outward expansion thereof.

2. In combination, a pair of telescoping members, one of said members having adjacent one end a rearwardly facing, forwardly and outwardly inclined shoulder, a resilient clamping ring comprising a rubber sleeve fitting about the second of said members and having adjacent its rear end a continuous circumferential bead provided with a forwardly facing, rearwardly and inwardly inclined shoulder adapted to engage behind said first mentioned shoulder when the coupling is engaged, means adjacent the forward end of said ring for securing the same to the said second mentioned member, and a restraining collar slidably carried by said second mentioned member and adapted to be moved into and out of encircling relation to the rear end of said ring.

3. In combination, a pair of telescoping members, the outer of which has an external bead adjacent one end thereof, a resilient clamping ring closely fitting about the inner of said members and having adjacent its rear end an internal circumferential bead adapted to engage behind said first bead, said ring having an internal kerf, a cylindrical anchor piece fitting and secured to said inner member and having a radial flange fitting in said kerf, a restraining collar having a portion slidably encircling said inner member and having a portion adapted to encircle the rear end of said clamping ring to prevent outward expansion thereof when the parts are in coupled condition.

OSCAR M. ANDERSON.